(12) United States Patent
Hosoda et al.

(10) Patent No.: US 8,324,338 B2
(45) Date of Patent: Dec. 4, 2012

(54) OLIGOMER REMOVING AGENT FOR POLYESTER-BASED FIBER MATERIAL

(75) Inventors: Masaaki Hosoda, Fukui (JP); Masatoshi Hayashi, Fukui (JP)

(73) Assignee: Nicca Chemical Co., Ltd., Fukui-shi (JP)

( * ) Notice: Subject to any disclaimer, the term of this patent is extended or adjusted under 35 U.S.C. 154(b) by 3 days.

(21) Appl. No.: 13/011,749

(22) Filed: Jan. 21, 2011

(65) Prior Publication Data

US 2011/0107526 A1 May 12, 2011

Related U.S. Application Data

(62) Division of application No. 11/988,059, filed as application No. PCT/JP2007/059407 on Apr. 25, 2007, now abandoned.

(30) Foreign Application Priority Data

May 16, 2006 (JP) .................................. 2006-136522

(51) Int. Cl.
*C08G 63/68* (2006.01)

(52) U.S. Cl. ........ 528/295; 528/272; 528/293; 528/300; 528/308; 528/308.3; 8/512; 8/532; 8/550; 8/552; 8/557; 8/587; 8/588; 8/599; 8/133; 8/137.5; 521/48; 524/423; 525/35; 510/108; 510/517; 510/528; 510/536

(58) Field of Classification Search .................. 528/176, 528/272, 290, 296, 300, 301, 302, 307, 308.6, 528/308, 480, 293, 294, 295, 308.2, 308.3; 525/35, 36, 48, 176, 445; 510/108, 471, 510/475, 476, 477, 504, 513, 517, 528, 536; 521/48, 48.5; 8/133, 137.5, 401, 440, 442, 8/506, 512, 532, 550, 552, 557, 587, 588, 8/599; 524/418, 423
See application file for complete search history.

(56) References Cited

U.S. PATENT DOCUMENTS

| | | | |
|---|---|---|---|
| 3,776,766 A | 12/1973 | Smerz et al. | |
| 4,250,296 A | 2/1981 | Weckler et al. | |
| 4,427,557 A | 1/1984 | Stockburger | |
| 4,702,857 A | 10/1987 | Gosselink | |
| 2004/0034137 A1 | 2/2004 | Kando et al. | |
| 2007/0277327 A1* | 12/2007 | Wessling et al. | .................. 8/137 |

FOREIGN PATENT DOCUMENTS

| | | |
|---|---|---|
| JP | 47-10661 | 5/1972 |
| JP | 54-42475 | 4/1979 |
| JP | 57-195121 | 11/1982 |
| JP | 61-108781 | 5/1986 |
| JP | 63-019531 | 1/1988 |
| JP | 2000-154466 | 6/2000 |
| JP | 2001-295136 | 10/2001 |
| WO | WO 03/000981 A1 | 1/2003 |
| WO | WO 2005097959 A1 * | 10/2005 |

OTHER PUBLICATIONS

International Search Report, dated Jul. 10, 2007, corresponding to PCT/JP2007/059407.
Office action dated Apr. 13, 2010 cited in corresponding Japanese application No. 2006-136522; 2pp.

* cited by examiner

*Primary Examiner* — Frances Tischler
(74) *Attorney, Agent, or Firm* — Christie, Parker & Hale, LLP.

(57) ABSTRACT

An oligomer removing agent for polyester-based fiber materials comprises a polyester copolymer which is obtained by polycondensation of a dibasic acid component containing 15-65 mol % of a sulfonate group-containing dibasic acid and a dihydric alcohol component containing polyethylene glycol with a molecular weight of 900-3500, and which has a 200° C. melt viscosity of 5000-23,000 mPa·s and has 10-40 mass % polyoxyethylene chains in the molecule. The oligomer removing agent is able to overcome the problems caused by deposition of polyester oligomers, when added to the dyeing bath in a dyeing step for polyester fiber materials or for fiber materials that are composites thereof with other fiber materials.

1 Claim, No Drawings

OLIGOMER REMOVING AGENT FOR POLYESTER-BASED FIBER MATERIAL

CROSS-REFERENCE TO RELATED APPLICATION

This application is a divisional application of U.S. patent application Ser. No. 11/988,059, filed on Dec. 28, 2007, now abandoned, which is a National Phase Patent Application of International Application Number PCT/JP2007/059407, filed on Apr. 25, 2007, which claims priority of Japanese Patent Application Number 2006-136522, filed on May 16, 2006.

TECHNICAL FIELD

The present invention relates to an oligomer removing agent that is suitable for polyester-based fiber materials that are polyester fiber materials and composite materials of polyester fiber materials with other fiber materials.

BACKGROUND ART

Polyester-based fiber materials that are polyester fiber materials and composites thereof with other fiber materials are usually dyed under high temperature conditions of 100-140° C., but polyester oligomers cause various troubles by eluting from the polyester-based fiber material onto the fiber surfaces or into the dyeing bath. The serious problems that are faced are shadow spots or calender contamination that occur when the polyester-based fiber material is a fabric, and powder generation or winding yarn breakage that occur when it is a yarn. In order to solve such problems, methods have been adopted that involve adding oligomer removing agents to the dyeing bath or to the reduction/cleaning bath after dyeing. For example, Japanese Unexamined Patent Publication No. 2000-154466 discloses a method for preventing trouble resulting from oligomer deposition, by adding to the dyeing bath an oligomer removing agent comprising a sulfonic acid salt of polyoxyethylenestyryl phenyl ether, and a carboxyl group-containing polymer such as an acrylic acid or methacrylic acid polymer or a salt thereof. Also, Japanese Unexamined Patent Publication No. 2001-295136 discloses a method for preventing oligomer elution wherein during the dyeing step there is added to the dyeing bath an oligomer preventing agent comprising an ester of a polyhydric alcohol-alkylene oxide addition product and an alkyl or alkenyl fatty acid, or an ester obtained by transesterification between a polyhydric alcohol-alkylene oxide addition product and a natural animal or vegetable fat or oil containing an alkyl or alkenyl fatty acid. However, the polyester oligomer removing effect is low even with addition of such oligomer removing agents or preventing agents, and it is not possible at the current time to achieve a satisfactory oligomer removing effect, especially with acidic baths.

DISCLOSURE OF THE INVENTION

It is an object of the present invention to provide an oligomer removing agent for polyester-based fiber materials which can solve the various problems caused by deposition of polyester oligomers, by its addition to the dyeing bath in the dyeing step for a fiber material composed of a polyester fiber material or a composite material thereof with another fiber material.

As a result of much diligent research with the aim of solving the aforementioned problems, the present inventors have discovered that the problem of oligomer deposition in the dyeing step for polyester-based fiber materials can be overcome by using as the oligomer removing agent a polyester copolymer obtained by polycondensation between a dibasic acid component comprising a sulfonate group-containing dibasic acid in a specified amount and a dihydric alcohol component containing polyethylene glycol in a specified amount, and have completed this invention on the basis of this discovered knowledge.

Specifically, the invention provides an oligomer removing agent for polyester-based fiber materials, characterized by comprising a polyester copolymer which is obtained by polycondensation of a dibasic acid component containing 15-65 mol % of a sulfonate group-containing dibasic acid and a dihydric alcohol component containing polyethylene glycol with a molecular weight of 900-3500, and which has a 200° C. melt viscosity of 5000-23,000 mPa·s and has 10-40 mass % polyoxyethylene chain in the molecule.

Because the oligomer removing agent of the invention is polyester copolymer-based, it has high affinity with polyester oligomers and allows oligomers to be stably maintained in water. Moreover, since the oligomer removing agent of the invention contains a sulfonate group, the oligomers do not become redeposited on the fiber material or dyeing machine, and therefore the agent can be suitably used in dyeing steps.

BEST MODE FOR CARRYING OUT THE INVENTION

Preferred modes of the invention will now be explained with the understanding that the invention is not limited only to these modes, and that various modifications may be made as are within the spirit and scope of the invention.

The oligomer removing agent of the invention comprises a polyester copolymer obtained by polycondensation of a dibasic acid component containing 15-65 mol % of a sulfonate group-containing dibasic acid and a dihydric alcohol component containing polyethylene glycol with a molecular weight of 900-3500. As preferred sulfonate group-containing dibasic acids there may be mentioned metal salts of sulfoterephthalic acid, 5-sulfoisophthalic acid and 4-sulfophthalic acid, as well as their ester derivatives such as dimethyl esters, diethyl esters and diphenyl esters. As metal salts there may be mentioned lithium salts, sodium salts, potassium salts and magnesium salts, among which sodium and potassium salts are particularly preferred. The content of the sulfonate group-containing dibasic acid in the dibasic acid component is in the range of 15-65 mol %. The polyester oligomer removing power will be impaired if the sulfonate group-containing dibasic acid is present at less than 15 mol % in the dibasic acid component. This is believed to be because a low sulfonate group content lowers the oligomer dispersibility, leading to redeposition of the oligomer in the fiber material. On the other hand, a content exceeding 65 mol % will impede polycondensation reaction of the polyester copolymer. As dibasic acids other than sulfonate group-containing dibasic acids in the dibasic acid component used for copolymerization there may be mentioned aromatic carboxylic acids such as terephthalic acid, isophthalic acid, naphthalenedicarboxylic acid, diphenyldicarboxylic acid, diphenoxyethanedicarboxylic acid, β-hydroxyethoxybenzoic acid and p-hydroxybenzoic acid and aliphatic carboxylic acids such as adipic acid, sebacic acid, maleic acid and succinic acid, and there may also be used their acid anhydrides or ester derivatives thereof with lower alcohols or glycols.

The oligomer removing agent of the invention further contains polyethylene glycol with a molecular weight of 900-

3500, as a dihydric alcohol component, in a different starting material for synthesis of the polyester copolymer to be used in the agent. A molecular weight of less than 900 for the polyethylene glycol will tend to lower the oligomer removing power, while a molecular weight of greater than 3500 will tend to impair the dispersibility of the disperse dye. The polyester copolymer also contains 10-40 mass % of polyoxyethylene chains deriving from the polyethylene glycol. A polyoxyethylene chain content of less than 10 mass % will tend to reduce the removing power of the oligomer, while a polyoxyethylene chain content of greater than 40 mass % will tend to increase the frequency of problems such as insufficient disperse dye dispersibility and high foamability during the dyeing process. Ethylene glycol is preferred as a dihydric alcohol other than the polyethylene glycol in the dihydric alcohol component used for synthesis of the polyester copolymer, but there may also be used aliphatic or aromatic diol compounds including C3 or greater alkylene glycols, neopentyl glycol, bisphenol A, bisphenol S and the like.

The polyester copolymer used for the oligomer removing agent of the invention preferably has a 200° C. melt viscosity of 5000-23,000 mPa·s. According to the invention, the 200° C. melt viscosity may be measured using a CV-1S cone-plate viscometer by M.S.T. Engineering, selecting a cone type and rotation rate suitable for the melt viscosity, based on the manufacturer's instruction manual. According to the invention, a melt viscosity of less than 5000 mPa·s will tend to reduce the polyester oligomer removing power, and may lower the affinity of the oligomer removing agent with the polyester-based fiber material. A melt viscosity of greater than 23,000 mPa·s will increase residue of the oligomer removing agent on the polyester-based fiber material, possibly adversely affecting the subsequent finishing step. The oligomer removing agent of the invention, that comprises a polyester copolymer satisfying the conditions including the sulfonate group-containing dibasic acid content, the content of polyoxyethylene chain from polyethylene glycol with a molecular weight of 900-3500 and the 200° C. melt viscosity, is characterized by exhibiting an excellent ability to remove oligomers from polyester-based fiber materials and minimizing their redeposition onto polyester-based fiber materials and dyeing machines. From the standpoint of handleability, the oligomer removing agent of the invention is preferably used as an aqueous dispersion or emulsion containing the polyester copolymer at 10-50 mass %.

The process for producing the polyester copolymer of the invention may be any conventional process such as transesterification or direct polymerization, without any particularly restrictions.

As polyester-based fiber materials from which oligomers are to be removed using the oligomer removing agent of the invention, there may be mentioned polyester fiber materials composed of polyethylene terephthalate, polybutylene terephthalate, polypropylene terephthalate, polytrimethylene terephthalate and their copolymers, or composite fiber materials composed of these polyester fiber materials in combination with other synthetic or natural fiber materials, while the form of the fiber material may be a yarn, knitted fabric, woven fabric, nonwoven fabric or the like.

The dyeing process used for dyeing of the polyester fiber material or composite fiber material using the oligomer removing agent of the invention may be an immersion process which may include jet dyeing, cheese dyeing, beam dyeing, Obermaier dyeing, high-pressure injection dyeing or the like, but any process may be employed without any particular restrictions so long as it allows the object of the invention to be achieved.

The invention will now be explained in greater detail using examples, with the understanding that the invention is in no way limited in scope by the examples.

Example 1

In a reactor there were charged 116.4 g (0.6 mol) of dimethyl terephthalate, 118.4 g (0.4 mol) of dimethyl 5-sulfoisophthalate sodium salt, 57 g of ethylene glycol, 86 g of polyethylene glycol with a molecular weight of 1000 and 0.1 g of zinc acetate, and the temperature was increased from 150° C. to 230° C. over a period of 3 hours with stirring under a nitrogen gas atmosphere for transesterification, while distilling out the methanol from the system. Next, 0.1 g of tetrabutyl titanate was added, the pressure was gradually reduced to an internal pressure of approximately 10 kPa, and reaction was conducted at 250° C. for 2 hours to obtain 314 g of a polyester copolymer. The content of polyoxyethylene chains in the obtained polyester copolymer was approximately 27 mass %, and the 200° C. melt viscosity as measured using a CV-1S cone-plate viscometer by M.S.T. Engineering was 12,000 mPa·s, after selecting the type of cone and rotation rate suitable for the melt viscosity as according to the manufacturer's instruction manual.

Example 2

The same procedure was carried out as in Example 1, except for charging into the reactor 155.2 g (0.8 mol) of dimethyl terephthalate, 59.2 g (0.2 mol) of dimethyl 5-sulfoisophthalate sodium salt, 58 g of ethylene glycol, 131 g of polyethylene glycol with a molecular weight of 2000 and 0.1 g of zinc acetate, to obtain 340 g of a polyester copolymer. The polyoxyethylene chain content of the obtained polyester copolymer was approximately 38 mass %, and the 200° C. melt viscosity was 20,000 mPa·s.

Example 3

The same procedure was carried out as in Example 1, except for charging into the reactor 135.8 g (0.7 mol) of dimethyl terephthalate, 88.8 g (0.3 mol) of dimethyl 5-sulfoisophthalate sodium salt, 54 g of ethylene glycol, 136 g of polyethylene glycol with a molecular weight of 1000 and 0.1 g of zinc acetate, to obtain 350 g of a polyester copolymer. The polyoxyethylene chain content of the obtained polyester copolymer was approximately 38 mass %, and the 200° C. melt viscosity was 8100 mPa·s.

Example 4

The same procedure was carried out as in Example 1, except for charging into the reactor 97 g (0.5 mol) of dimethyl terephthalate, 148 g (0.5 mol) of dimethyl 5-sulfoisophthalate sodium salt, 61 g of ethylene glycol, 38 g of polyethylene glycol with a molecular weight of 2000 and 0.1 g of zinc acetate, to obtain 280 g of a polyester copolymer. The polyoxyethylene chain content of the obtained polyester copolymer was approximately 13 mass %, and the 200° C. melt viscosity was 8900 mPa·s.

Example 5

The same procedure was carried out as in Example 1, except for charging into the reactor 77.6 g (0.4 mol) of dimethyl terephthalate, 177.6 g (0.6 mol) of dimethyl 5-sulfoisophthalate sodium salt, 60 g of ethylene glycol, 39 g of polyethylene glycol with a molecular weight of 1000 and 0.1 g of zinc acetate, to obtain 290 g of a polyester copolymer. The polyoxyethylene chain content of the obtained polyester copolymer was approximately 13 mass %, and the 200° C. melt viscosity was 7500 mPa·s.

Example 6

The same procedure was carried out as in Example 1, except for charging into the reactor 116.4 g (0.6 mol) of dimethyl terephthalate, 118.4 g (0.4 mol) of dimethyl 5-sulfoisophthalate sodium salt, 61 g of ethylene glycol, 83 g of polyethylene glycol with a molecular weight of 3000 and 0.1 g of zinc acetate, to obtain 315 g of a polyester copolymer. The polyoxyethylene chain content of the obtained polyester copolymer was approximately 26 mass %, and the 200° C. melt viscosity was 10,000 mPa·s.

Example 7

The same procedure was carried out as in Example 1, except for charging into the reactor 129.6 g (0.6 mol) of 1,8-naphthalenedicarboxylic acid, 118.4 g (0.4 mol) of dimethyl 5-sulfoisophthalate sodium salt, 57 g of ethylene glycol, 85 g of polyethylene glycol with a molecular weight of 1000 and 0.1 g of zinc acetate, to obtain 343 g of a polyester copolymer. The polyoxyethylene chain content of the obtained polyester copolymer was approximately 24 mass %, and the 200° C. melt viscosity was 11,000 mPa·s.

Example 8

The same procedure was carried out as in Example 1, except for charging into the reactor 58.8 g (0.6 mol) of maleic anhydride, 118.4 g (0.4 mol) of dimethyl 5-sulfoisophthalate sodium salt, 58 g of ethylene glycol, 68 g of polyethylene glycol with a molecular weight of 1000 and 0.1 g of zinc acetate, to obtain 267 g of a polyester copolymer. The polyoxyethylene chain content of the obtained polyester copolymer was approximately 25 mass %, and the 200° C. melt viscosity was 10,000 mPa·s.

Example 9

The same procedure was carried out as in Example 1, except for charging into the reactor 116.4 g (0.6 mol) of dimethyl terephthalate, 118.4 g (0.4 mol) of dimethyl 5-sulfoisophthalate sodium salt, 83 g of 1,4-butanediol, 83 g of polyethylene glycol with a molecular weight of 1000 and 0.1 g of zinc acetate, to obtain 337 g of a polyester copolymer. The polyoxyethylene chain content of the obtained polyester copolymer was approximately 24 mass %, and the 200° C. melt viscosity was 11,000 mPa·s.

Example 10

The same procedure was carried out as in Example 1, except for charging into the reactor 116.4 g (0.6 mol) of dimethyl terephthalate, 118.4 g (0.4 mol) of dimethyl 5-sulfoisophthalate sodium salt, 96 g of neopentyl glycol, 83 g of polyethylene glycol with a molecular weight of 1000 and 0.1 g of zinc acetate, to obtain 350 g of a polyester copolymer. The polyoxyethylene chain content of the obtained polyester copolymer was approximately 23 mass %, and the 200° C. melt viscosity was 12,000 mPa·s.

Example 11

The same procedure was carried out as in Example 1, except for charging into the reactor 116.4 g (0.6 mol) of dimethyl terephthalate, 118.4 g (0.4 mol) of dimethyl 5-sulfoisophthalate sodium salt, 310 g of a bisphenol S-ethylene oxide 2 mol adduct, 83 g of polyethylene glycol with a molecular weight of 1000 and 10.1 g of zinc acetate, to obtain 564 g of a polyester copolymer. The polyoxyethylene chain content of the obtained polyester copolymer was approximately 14 mass %, and the 200° C. melt viscosity was 12,000 mPa·s.

Example 12

The same procedure was carried out as in Example 1, except for charging into the reactor 116.4 g (0.6 mol) of dimethyl terephthalate, 124.8 g (0.4 mol) of dimethyl 5-sulfoisophthalate potassium salt, 57 g of ethylene glycol, 86 g of polyethylene glycol with a molecular weight of 1000 and 0.1 g of zinc acetate, to obtain 320 g of a polyester copolymer. The polyoxyethylene chain content of the obtained polyester copolymer was approximately 26 mass %, and the 200° C. melt viscosity was 14,000 mPa·s.

Example 13

The same procedure was carried out as in Example 1, except for charging into the reactor 116.4 g (0.6 mol) of dimethyl terephthalate, 118.4 g (0.4 mol) of dimethyl sulfoterephthalate sodium salt, 57 g of ethylene glycol, 86 g of polyethylene glycol with a molecular weight of 1000 and 0.1 g of zinc acetate, to obtain 314 g of a polyester copolymer. The polyoxyethylene chain content of the obtained polyester copolymer was approximately 27 mass %, and the 200° C. melt viscosity was 15,000 mPa·s.

Example 14

The same procedure was carried out as in Example 1, except for charging into the reactor 116.4 g (0.6 mol) of dimethyl terephthalate, 124.8 g (0.4 mol) of dimethyl sulfoterephthalate potassium salt, 57 g of ethylene glycol, 86 g of polyethylene glycol with a molecular weight of 1000 and 0.1 g of zinc acetate, to obtain 320 g of a polyester copolymer. The polyoxyethylene chain content of the obtained polyester copolymer was approximately 26 mass %, and the 200° C. melt viscosity was 13,000 mPa·s.

Example 15

The same procedure was carried out as in Example 1, except for charging into the reactor 116.4 g (0.6 mol) of dimethyl terephthalate, 129.6 g (0.4 mol) of diethyl 4-sulfophthalate sodium salt, 57 g of ethylene glycol, 86 g of polyethylene glycol with a molecular weight of 1000 and 0.1 g of zinc acetate, to obtain 297 g of a polyester copolymer. The polyoxyethylene chain content of the obtained polyester copolymer was approximately 28 mass %, and the 200° C. melt viscosity was 12,000 mPa·s.

Example 16

The same procedure was carried out as in Example 1, except for charging into the reactor 116.4 g (0.6 mol) of dimethyl terephthalate, 136.0 g (0.4 mol) of diethyl 4-sulfophthalate potassium salt, 57 g of ethylene glycol, 86 g of polyethylene glycol with a molecular weight of 1000 and 0.1 g of zinc acetate, to obtain 303 g of a polyester copolymer. The polyoxyethylene chain content of the obtained polyester copolymer was approximately 27 mass %, and the 200° C. melt viscosity was 12,000 mPa·s.

Comparative Example 1

The same procedure was carried out as in Example 1, except for charging into the reactor 174.6 g (0.9 mol) of dimethyl terephthalate, 29.6 g (0.1 mol) of dimethyl 5-sulfoisophthalate sodium salt, 58 g of ethylene glycol, 74 g of polyethylene glycol with a molecular weight of 1000 and 0.1 g of zinc acetate, to obtain 272 g of a polyester copolymer. The polyoxyethylene chain content of the obtained polyester copolymer was approximately 26 mass %, and the 200° C. melt viscosity was 9200 mPa·s.

Comparative Example 2

In a reactor there were charged 58.2 g (0.3 mol) of dimethyl terephthalate, 207.2 g (0.7 mol) of dimethyl 5-sulfoisophthalate sodium salt, 60 g of ethylene glycol, 90 g of polyethylene glycol with a molecular weight of 2000 and 0.1 g of zinc acetate, and the temperature was increased from 150° C. to 230° C. over a period of 3 hours with stirring under a nitrogen gas atmosphere for transesterification, while distilling out the methanol from the system. Next, 0.1 g of tetrabutyl titanate was added and the pressure was gradually reduced, but stirring became impossible when the internal pressure reached approximately 30 kPa, and the reaction could not be continued.

Comparative Example 3

The same procedure was carried out as in Example 1, except for charging into the reactor 116.4 g (0.6 mol) of dimethyl terephthalate, 118.4 g (0.4 mol) of dimethyl 5-sulfoisophthalate sodium salt, 56 g of ethylene glycol, 83 g of polyethylene glycol with a molecular weight of 800 and 0.1 g of zinc acetate, to obtain 310 g of a polyester copolymer. The polyoxyethylene chain content of the obtained polyester copolymer was approximately 26 mass %, and the 200° C. melt viscosity was 9700 mPa·s.

Comparative Example 4

The same procedure was carried out as in Example 1, except for charging into the reactor 116.4 g (0.6 mol) of dimethyl terephthalate, 118.4 g (0.4 mol) of dimethyl 5-sulfoisophthalate sodium salt, 61 g of ethylene glycol, 83 g of polyethylene glycol with a molecular weight of 4000 and 0.1 g of zinc acetate, to obtain 315 g of a polyester copolymer. The polyoxyethylene chain content of the obtained polyester copolymer was approximately 26 mass %, and the 200° C. melt viscosity was 10,000 mPa·s.

Comparative Example 5

In a reactor there were charged 116.4 g (0.6 mol) of dimethyl terephthalate, 118.4 g (0.4 mol) of dimethyl 5-sulfoisophthalate sodium salt, 62 g of ethylene glycol, 24 g of polyethylene glycol with a molecular weight of 2000 and 0.1 g of zinc acetate, and the temperature was increased from 150° C. to 230° C. over a period of 3 hours with stirring under a nitrogen gas atmosphere for transesterification, while distilling out the methanol from the system. Next, 0.1 g of tetrabutyl titanate was added and the pressure was gradually reduced, but stirring became impossible when the internal pressure reached approximately 40 kPa, and the reaction could not be continued.

Comparative Example 6

The same procedure was carried out as in Example 1, except for charging into the reactor 116.4 g (0.6 mol) of dimethyl terephthalate, 118.4 g (0.4 mol) of dimethyl 5-sulfoisophthalate sodium salt, 49 g of ethylene glycol, 218 g of polyethylene glycol with a molecular weight of 1000 and 0.1 g of zinc acetate, to obtain 438 g of a polyester copolymer. The polyoxyethylene chain content of the obtained polyester copolymer was approximately 48 mass %, and the 200° C. melt viscosity was 11,000 mPa·s.

Comparative Example 7

In a reactor there were charged 116.4 g (0.6 mol) of dimethyl terephthalate, 118.4 g (0.4 mol) of dimethyl 5-sulfoisophthalate sodium salt, 57 g of ethylene glycol, 83 g of polyethylene glycol with a molecular weight of 1000 and 0.1 g of zinc acetate, and the temperature was increased from 150° C. to 230° C. over a period of 3 hours with stirring under a nitrogen gas atmosphere for transesterification, while distilling out the methanol from the system. Next, 0.1 g of tetrabutyl titanate was added and the pressure was gradually reduced, and when the internal pressure reached approximately 30 kPa, reaction was terminated and the mixture was cooled to obtain 312 g of a polyester copolymer. The polyoxyethylene chain content of the obtained polyester copolymer was approximately 26 mass %, and the 200° C. melt viscosity was 3200 mPa·s.

Comparative Example 8

In a reactor there were charged 116.4 g (0.6 mol) of dimethyl terephthalate, 118.4 g (0.4 mol) of dimethyl 5-sulfoisophthalate sodium salt, 57 g of ethylene glycol, 83 g of polyethylene glycol with a molecular weight of 1000 and 0.1 g of zinc acetate, and the temperature was increased from 150° C. to 230° C. over a period of 3 hours with stirring under a nitrogen gas atmosphere for transesterification, while distilling out the methanol from the system. Next, 0.1 g of tetrabutyl titanate was added and the pressure was gradually reduced to an internal pressure of approximately 9 kPa, and reaction was conducted at 250° C. for 5 hours to obtain 311 g of a polyester copolymer. The polyoxyethylene chain content of the obtained polyester copolymer was approximately 26 mass %, and the 200° C. melt viscosity was 25,000 mPa·s.

The results from synthesizing these polyester copolymers are summarized in Table 1.

TABLE 1

| | Sulfonate group/total dibasic acid components (mol %) | Polyoxy-ethylene chain content (mass %) | 200° C. Melt viscosity (mPa · s) |
|---|---|---|---|
| Example 1 | 40 | 27 | 12000 |
| Example 2 | 20 | 38 | 20000 |
| Example 3 | 30 | 38 | 8100 |
| Example 4 | 50 | 13 | 8900 |
| Example 5 | 60 | 13 | 7500 |
| Example 6 | 40 | 26 | 10000 |
| Example 7 | 40 | 24 | 11000 |
| Example 8 | 40 | 25 | 10000 |

TABLE 1-continued

|  | Sulfonate group/total dibasic acid components (mol %) | Polyoxy-ethylene chain content (mass %) | 200° C. Melt viscosity (mPa · s) |
|---|---|---|---|
| Example 9 | 40 | 24 | 11000 |
| Example 10 | 40 | 23 | 12000 |
| Example 11 | 40 | 14 | 12000 |
| Example 12 | 40 | 26 | 14000 |
| Example 13 | 40 | 27 | 15000 |
| Example 14 | 40 | 26 | 13000 |
| Example 15 | 40 | 28 | 12000 |
| Example 16 | 40 | 27 | 12000 |
| Comp. Ex. 1 | 10 | 26 | 9200 |
| Comp. Ex. 2 | 70 | 25 | reaction not continued |
| Comp. Ex. 3 | 40 | 26 | 9700 |
| Comp. Ex. 4 | 40 | 26 | 10000 |
| Comp. Ex. 5 | 40 | 9 | reaction not continued |
| Comp. Ex. 6 | 40 | 48 | 11000 |
| Comp. Ex. 7 | 40 | 26 | 3200 |
| Comp. Ex. 8 | 40 | 26 | 25000 |

The oligomer removing agents obtained in the examples and comparative examples were evaluated in the following manner.

Oligomer Removing Power Test

For comparison of the oligomer removing effects during dyeing, polyester satin woven fabrics containing the oligomer removing agents of Examples 1-16 and Comparative Examples 1, 3, 4 6-8 and dyed under the following conditions were subjected to extraction using 1,4-dioxane, and the UV absorbance of the extracts at 286 nm were measured to calculated the oligomer deposition per gram of fabric.

The results are shown in Table 2.
Dyeing bath
Dye: C.I. Disperse Blue 79 1% o.w.f.
80% Acetic acid1 g/L
Disperse level dyeing agent: NICCA SANSOLT SN-558 (Nicca Chemical Co., Ltd.) 1 g/L
Oligomer removing agent 0.3 g/L
Dyeing temperature×time: 130° C.×30 minutes
Liquor to goods ratio=15:1

Dye Dispersibility Test

For comparison of the dye dispersibilities during dyeing, a scoured polyester knit was wrapped around the holder of a CARAPET (Nihon Senshoku Kikai Co.) and anchored above and below with rubber bands, and this was dyed under the conditions described below with addition of one of the oligomer removing agents of Examples 1-16 or Comparative Examples 1, 3, 4 and 6-8, after which the extent of casing spots left on the polyester knit was visually observed and the dye dispersibility was evaluated on a 5-level scale, from 5 (no casing spots) to 1 (numerous casing spots).

The results are shown in Table 2.
Dyeing bath
Dye: C.I. Disperse Red 167 2% o.w.f.
80% Acetic acid1 g/L
Disperse level dyeing agent: NICCA SANSOLT SN-558 (Nicca Chemical Co., Ltd.)1 g/L
Oligomer removing agent 0.3 g/L
Dyeing temperature×time: 115° C.×1 minute
Liquor to goods ratio=30:1

Persistence Test

For comparison of the persistences of the oligomer removing agents onto dyed fabrics, polyester satin woven fabrics dyed under the same dyeing conditions as in the oligomer removing power test described above were dried at 120° C. for 1 minute and then heat treated at 180° C. for 30 seconds. After then cooling to room temperature, a single drop of water was dropped onto the fabric and the time until complete permeation of the water drop from the fabric surface was measured. A lack of water absorption is judged as a lack of persistence of the oligomer removing agent.

The results are shown in Table 2.

Processing Suitability Test

For comparison of the processing suitability for dyeing, a high-temperature, high-pressure jet dyeing machine (MINI-JET D-100 by Texam Co., Ltd.) was used for placement of a polyester pongee in a treatment bath containing the oligomer removing agent of one of Examples 1-16 or Comparative Examples 1, 3, 4 and 6-8 under the conditions described below, and the condition of bubbles between 60-130° C. with a heating rate of 3° C./min was compared to one without addition of an oligomer removing agent. The evaluation was conducted on a 3-level scale of A (equivalent to no addition), B (more foaming than with no addition) and C (considerable foaming compared to no addition), and samples with minimal foaming were judged as satisfactory.

The results of the evaluation are shown in Table 2.
Treatment bath
80% Acetic acid1 g/L
Disperse level dyeing agent: NICCA SANSOLT SN-558 (Nicca Chemical Co., Ltd.)1 g/L
Oligomer removing agent 0.3 g/L
Liquor to goods ratio=30:1

TABLE 2

| Oligomer removal agent | Oligomer deposition mg/g | Dye dispers-ibility | Persis-tence (sec) | Process-ing suit-ability |
|---|---|---|---|---|
| Example 1 | 9.7 | 5 | 180< | A |
| Example 2 | 10.4 | 5 | 180< | A |
| Example 3 | 10.1 | 5 | 180< | A |
| Example 4 | 11.7 | 5 | 180< | A |
| Example 5 | 11.3 | 5 | 180< | A |
| Example 6 | 18.8 | 5 | 180< | A |
| Example 7 | 10.3 | 5 | 180< | A |
| Example 8 | 11.9 | 5 | 180< | A |
| Example 9 | 11.1 | 5 | 180< | A |
| Example 10 | 10.8 | 5 | 180< | A |
| Example 11 | 10.9 | 5 | 180< | A |
| Example 12 | 10.1 | 5 | 180< | A |
| Example 13 | 9.9 | 5 | 180< | A |
| Example 14 | 10.3 | 5 | 180< | A |
| Example 15 | 10.7 | 5 | 180< | A |
| Example 16 | 10.9 | 5 | 180< | A |
| Comp. Ex. 1 | 25.8 | 5 | 180< | A |
| Comp. Ex. 3 | 26.7 | 5 | 180< | A |
| Comp. Ex. 4 | 18.8 | 2 | 180< | B |
| Comp. Ex. 6 | 26.5 | 2 | 180< | C |
| Comp. Ex. 7 | 28.4 | 5 | 180< | A |
| Comp. Ex. 8 | 9.3 | 5 | 30 | A |
| None used | 29.0 | 5 | 180< | A |

As seen by the results in Table 2, the oligomer removing agents of the invention examples were able to reduce the amount of oligomers without affecting the dyeing property, and also exhibited good processing suitability evidenced by low foaming during processing.

INDUSTRIAL APPLICABILITY

Using an oligomer removing agent-according to the invention can yield fiber products with satisfactory quality and no processing defects arising from oligomer deposition, while permitting more economical dyeing of fiber products due to reduced foaming during processing and thus less frequent occurrence of trouble during processing.

What is claimed is:

1. A method of dyeing polyester-based fiber materials comprising:

preparing a dyeing bath that contains a dye and an oligomer removing agent comprising a polyester copolymer which is obtained by polycondensation of a dibasic acid component containing 15-65 mol % of a sulfonate group-containing dibasic acid and a dihydric alcohol component containing polyethylene glycol, the polyethylene glycol having a molecular weight of 1000-3500, the polyester copolymer having a 200° C. melt viscosity of 5000-23,000 mPa·s and 10-40 mass % polyoxyethylene chain in the molecule; and dyeing the polyester-based fiber materials in the dyeing bath at a temperature of 100° C. to 140° C. to produce a dyed polyester-based fiber material that is substantially free of the oligomer removing agent.

* * * * *